US010509599B2

(12) United States Patent
Frolikov (10) Patent No.: US 10,509,599 B2
(45) Date of Patent: Dec. 17, 2019

(54) STACK MANAGEMENT IN MEMORY SYSTEMS

(71) Applicant: Micron Technology, Inc., Boise, ID (US)

(72) Inventor: Alex Frolikov, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 15/922,702

(22) Filed: Mar. 15, 2018

(65) Prior Publication Data

US 2019/0286366 A1 Sep. 19, 2019

(51) Int. Cl.
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 5,170,359 A * | 12/1992 | Sax | .......................... | G10L 25/48 324/102 |
| 5,636,362 A * | 6/1997 | Stone | .................... | G06F 9/4812 710/52 |
| 5,862,409 A * | 1/1999 | Yoshimoto | ................. | G06F 5/10 710/57 |
| 6,795,910 B1 * | 9/2004 | Tormey | ............... | G06F 11/0724 711/E12.101 |
| 9,460,002 B1 * | 10/2016 | Khokhar | ................ | G06F 12/023 |
| 2004/0078381 A1 * | 4/2004 | Blandy | ............... | G06F 12/0269 |
| 2005/0076166 A1 * | 4/2005 | Shearer | .................. | G06F 13/423 710/52 |
| 2005/0240934 A1 * | 10/2005 | Patterson | .............. | G06F 3/0613 718/105 |
| 2010/0131803 A1 * | 5/2010 | Lamie | ................. | G06F 11/3604 714/38.1 |
| 2011/0119463 A1 * | 5/2011 | Lee | ....................... | G06F 9/5016 711/170 |
| 2014/0359246 A1 * | 12/2014 | Park | ...................... | G06F 3/0653 711/170 |
| 2016/0259597 A1 * | 9/2016 | Worley | ................. | G06F 3/0688 |
| 2016/0306745 A1 * | 10/2016 | Lin | ........................ | G06F 9/383 |

OTHER PUBLICATIONS

"Stack (abstract data type)", Wikipedia, printed on Mar. 12, 2018.
"Stack-based memory allocation", Wikipedia, printed on Mar. 12, 2018.

* cited by examiner

*Primary Examiner* — Mano Padmanabhan
*Assistant Examiner* — William E. Baughman
(74) *Attorney, Agent, or Firm* — Greenberg Traurig, LLP (57) ABSTRACT

A memory system having a stack memory, a set of media, and a controller. The controller divides the stack memory into a plurality of stacks, measures usages of the stacks in a period of time of operating on the set of media, and adjusts partitioning of the stack memory into the plurality of stacks according to the measured usages.

14 Claims, 4 Drawing Sheets

FIG. 5

STACK MANAGEMENT IN MEMORY SYSTEMS

FIELD OF THE TECHNOLOGY

At least some embodiments disclosed herein relate to memory systems in general, and more particularly, but not limited to stack management.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

A stack in a computing device has a memory that allows data to be added into the memory for storage and then retrieved from the memory for consumption in a last in first output manner.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to partitioning of memory into multiple stacks according to the usages of the stacks in memory systems. An example of a memory system is a storage system, such as a solid-state drive (SSD). In some embodiments, the memory system is a hybrid memory/storage system. In general, a host system can utilize a memory system that includes one or more memory devices. The memory devices can include non-volatile memory devices, such as, for example, memory units formed based on negative-and (NAND) logic gates, memory units formed based on negative-or (NOR) logic gates, etc. The host system can provide write requests to store data at the memory devices of the memory system and can provide read requests to retrieve data stored at the memory system. A memory system can include a controller that manages the memory devices to perform operations such as reading data, writing data, or erasing data and other such operations. A storage system is used as one example of the memory system in the present disclosure.

In a memory system, a stack memory may be partitioned into multiple stacks that are used respectively by multiple processors (or processing cores, or processes). The stacks are generally used differently by the different processors (or processing cores, or processes) from time to time. For example, some of the processors may use more memory units in their stack operations during some time periods; and other may use less memory units and/or in other time periods. The stack usages can be dynamically monitored to optimize the partition of the stack memory into the stacks used by the processors, processing cores, and/or processes).

For example, the memory of the stacks can be initially filled with data having a predetermined value (or values of a predetermined pattern). When data items are pushed onto a stack and popped off the stack, the content of the stack is changed in general. However, the unused portion of the stack remains to have the predetermined value (or values of the predetermined pattern). Since the likelihood of data items that have been pushed onto the stack and popped off the stack being the same as the predetermined value (or having the same predetermined pattern) is negotiable (e.g., after a time period of usage of the stack), the maximum memory units used in the stack during the time period can be identified based on the content of the stack. Specifically, the region of the stack that has the predetermined value (or the predetermined value pattern) can be identified as memory units in the stack that have not been used; and the region of the stack that does not have the predetermined value (or the predetermined value pattern) can be identified as memory units in the stack that have been used during the stack operations. Thus, a count of the memory units that have been used provides a measurement of the maximum memory units required for the operations of the stack during the time period. The boundary between the region of the stack that has been used and the region of the stack that has not been used can be find efficiently using a binary search process; and the stack memory can be re-partitioned to balance or optimize the sizes of the stacks in accordance with the measurements of maximum memory units used in the past time period of the stack operations preceding the optimization.

Figure 1:
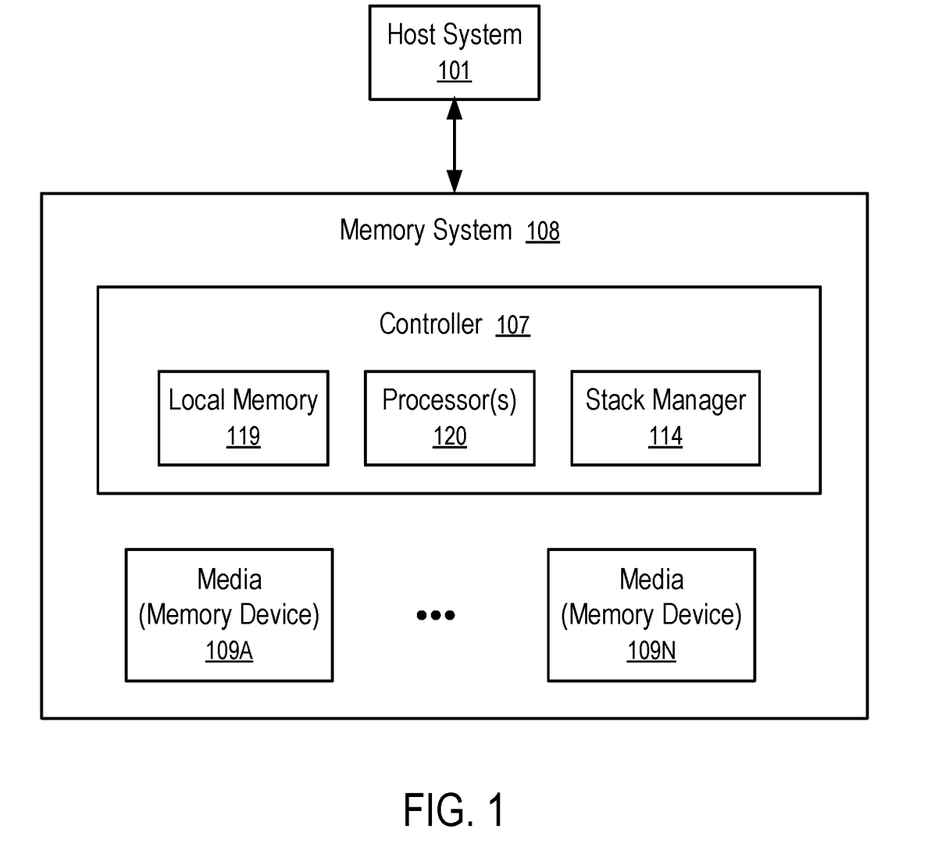
FIG. 1 shows a computing system having a stack manager in a memory system in accordance with some embodiments of the present disclosure.

FIG. 1 shows a computing system having a stack manager (114) in a memory system (108) accordance with some embodiments of the present disclosure. For example, the stack manager (114) of one embodiment measures the actual memory usages of stacks and reallocates memory resources among the stacks according to the measured memory usages.

In general, the memory system (108) can include media, such as memory devices (109A to 109N). The memory devices (109A to 109N) can be volatile memory devices, non-volatile memory (NVM) devices, or a combination of such. In some embodiments, the memory system (108) is a storage system. An example of a storage system is a solid state drive (SSD). In some embodiments, the memory system (108) is a hybrid memory/storage system. In general, the computing system can include a host system (101) that uses the memory system (108). In some implementations, the host system (101) can write data to the memory system (108) and read data from the memory system (108).

The host system (101) can be a computing device such as a desktop computer, laptop computer, network server, mobile device, or such computing device that includes a memory and a processing device. The host system (101) can include or be coupled to the memory system (108) so that the host system (101) can read data from or write data to the memory system (108). The host system (101) can be coupled to the memory system (108) via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc. The physical host interface can be used to transmit data between the host system (101) and the memory system (108). The host system (101) can further utilize an NVM Express (NVMe) interface to access the memory devices (109A to 109N) when the memory system (108) is coupled with the host system (101) by the PCIe interface. The physical host interface can provide an interface for passing control, address, data, and other signals between the memory system (108) and the host system (101).

The memory devices (109A to 109N) can include any combination of the different types of non-volatile memory devices and/or volatile memory devices. An example of non-volatile memory devices includes a negative-and (NAND) type flash memory. Each of the memory devices (109A to 109N) can include one or more arrays of memory cells such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system (101). Although non-volatile memory devices such as NAND type flash memory are described, the memory devices (109A to 109N) can be based on any other type of memory such as a volatile memory. In some implementations, the memory devices (109A to 109N) can be, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices (109A to 109N) can be grouped as memory pages or data blocks that can refer to a unit of the memory device used to store data.

The controller (107) can communicate with the memory devices (109A to 109N) to perform operations such as reading data, writing data, or erasing data at the memory devices (109A to 109N) and other such operations. The controller (107) can include hardware such as one or more integrated circuits and/or discrete components, a buffer memory, or a combination thereof. The controller (107) can be a microcontroller, special purpose logic circuitry (e.g., a field programmable gate array (FPGA), an application specific integrated circuit (ASIC), etc.), or another suitable processor. The controller (107) can include one or more processors (processing devices) (120) configured to execute instructions stored in local memory (119).

In the illustrated example, the local memory (119) of the controller (107) includes an embedded memory configured to store instructions for performing various processes, operations, logic flows, and routines that control operation of the memory system (108), including handling communications between the memory system (108) and the host system (101), and the functions of the stack manager (114), which is described in greater detail below. In some embodiments, the local memory (119) can include memory for implementation of stacks managed by the stack manager (114) and/or memory registers storing, e.g., memory pointers, fetched data, etc. The local memory (119) can include read-only memory (ROM) for storing micro-code.

While the example memory system (108) in FIG. 1 has been illustrated as including the controller (107), in another embodiment of the present disclosure, a memory system (108) may not include a controller (107), and may instead rely upon external control (e.g., provided by an external host, or by a processor or controller separate from the memory system).

In general, the controller (107) can receive commands or operations from the host system (101) and can convert the commands or operations into instructions or appropriate commands to achieve the desired access to the memory devices (109A to 109N). The controller (107) can be responsible for other operations such as wear leveling operations, garbage collection operations, error detection and error-correcting code (ECC) operations, encryption operations, caching operations, and address translations between a logical block address and a physical block address that are associated with the memory devices (109A to 109N). The controller (107) can further include host interface circuitry to communicate with the host system (101) via the physical host interface. The host interface circuitry can convert the commands received from the host system into command instructions to access the memory devices (109A to 109N) as well as convert responses associated with the memory devices (109A to 109N) into information for the host system (101).

The memory system (108) can also include additional circuitry or components that are not illustrated. In some implementations, the memory system (108) can include a cache or buffer (e.g., DRAM) and address circuitry (e.g., a row decoder and a column decoder) that can receive an address from the controller (107) and decode the address to access the memory devices (109A to 109N).

In one example, the host system (101) has one or more connectors to provide the memory system (108) with power and/or communicate with the memory system (108) via a communication channel and a predetermined protocol; and the memory system (108) has one or more connectors to receive the power, data and commands from the host system (101). For example, the connection between connector on the host system (101) and connector on memory system (108) may utilize a PCIe bus or a SATA bus.

Figure 2:
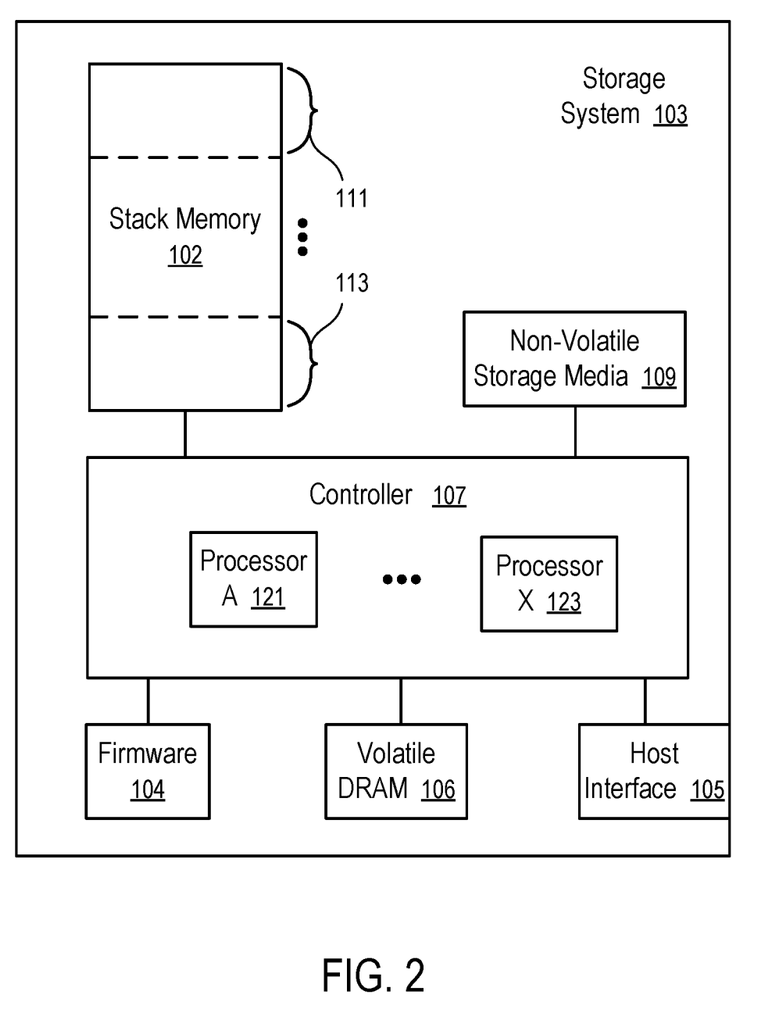
FIG. 2 shows a storage system having capability of managing the sizes of stacks.

FIG. 2 shows a storage system (103) having capability of managing the sizes of stacks. For example, the storage system (103) of FIG. 2 can be used as an example of the memory system (108) in the computing system of FIG. 1.

The storage system (103) has a stack memory (102) that is divided into multiple stacks (111, . . . , 113).

For example, the controller (107) of the storage system (103) has a plurality of processors (121, . . . , 123) that use the respective stacks (111, . . . , 113). In some instances, different running processes in the processors (121, . . . , 123) use different stacks (111, . . . , 113).

Some of the stacks use more memory than others in some time periods. When a stack (111) is used to store a number of data items before the top data item is popped off the stack (111), the number of data items represent the depth of the stack (111) at the time before the top data item is popped off the stack (111). The depth of the stack (111) changes generally during a period of usage. The maximum depth of the stack (111) during a time period represents the memory requirement of the stack during the time period. Different stacks (111, . . . , 113) generally have different memory requirements.

The storage system (103) is configured to monitor the memory requirements of the stacks (111, . . . , 113) in a time period and then adjust the partition of the stack memory (102) into the stacks (111, . . . , 113) according to their memory requirements such that a stack that is likely to require more memory is assigned a large portion of the stack memory (102). For example, the sizes of the stacks (111, . . . , 113) can be partitioned in proportional to the memory requirements in the past time period to reduce the likelihood of stack overflow. Stack overflow occurs when the memory requirement of a stack exceeds the size of the stack at a particular time instance of the use of the stack.

Figure 3:
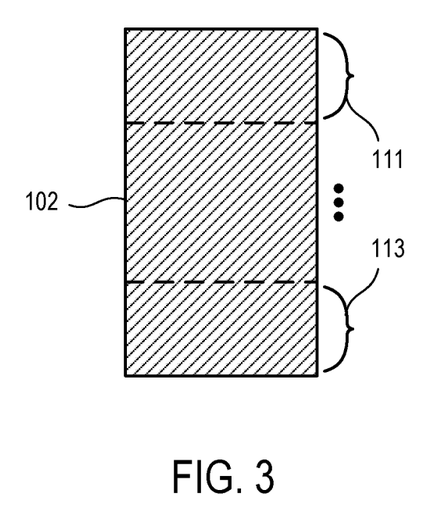
FIGS. 3 and 4 illustrate a technique to measure stack usages.
Figure 4:
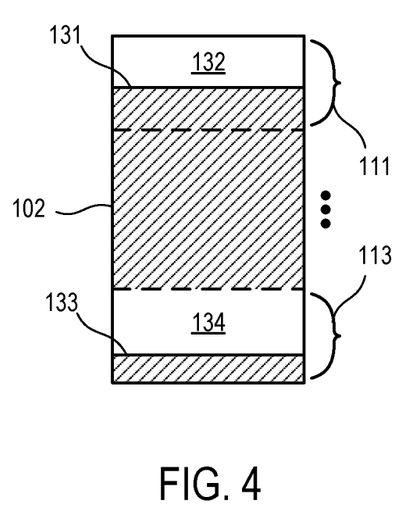

The memory requirements of the stacks can be determined using a technique illustrated in FIGS. 3 and 4.

For example, the technique of FIGS. 3 and 4 can be used in the memory system (108) of FIG. 1 in general and in the storage system (103) of FIG. 2 as an example.

In FIG. 3, the stack memory (102) is filled with data having a predetermined value (or data of a predetermined value pattern). Thus, the memory portions that store the predetermined value (or the predetermined value pattern) can be identified as portions of the stacks (111, . . . , 113) that have not been used during the past operations of the stacks (111, . . . , 113).

During the operations of the stacks, data is pushed onto the stacks and popped off the stacks. At some time instances, the stack (e.g., 111) holds more data that is pushed into the stack than other time instances. When data is pushed into the stack (e.g., 111), it changes the content of the used portion of the stack (e.g., 111) from the predetermined value (or the predetermined value pattern) to the data that is pushed onto the stack (e.g., 111). Some memory units in the stack may be overwritten multiple times during a time period of stack operations.

As illustrated in FIG. 4, data may be pushed onto a stack (e.g., 111) from the top side of the stack (e.g., 111) to reach a depth. The used portions (132, . . . , 134) of the stacks (111, . . . , 113) have content different from the predetermined value (or the predetermined value pattern). The boundaries (131, . . . , 133) between the unused portions storing the content having the predetermined value (or the predetermined value pattern) (e.g., illustrated as the shaded areas) and the used portions (132, . . . , 134) not storing the content having the predetermined value (or the predetermined value pattern) identify the maximum depths reached at some time instances during the usages of the respective stacks (111, . . . , 113).

A boundary (131, . . . , or 133) in a stack (111, . . . , 113) can be found efficiently using a binary search of the predetermined value (or the predetermined value pattern). For example, the stack manager (114) retrieves the data in the middle of a memory region that contains the boundary (131). Initially, the memory region may be the entire stack (111). If the data retrieved from the middle of a memory region has the predetermined value (or a value that agrees with the predetermined value pattern), the middle of the memory region is in the unused portion of the stack (e.g., 111); the boundary (131) can be determined to be in the upper portion of the memory region where data popped onto the stack (e.g., 111) and stored in the upper portion of the memory region would be popped off the stack (e.g., 111) after the data in the middle of the memory region is popped off the stack (e.g., 111); and the subsequent search is performed in the upper portion of the memory region, which reduces the area of search from the entire memory region to the upper portion of the memory region. If the data retrieved from the middle of a memory region does not have the predetermined value (or a value that agrees with the predetermined value pattern), the middle of the memory region is in the used portion of the stack (e.g., 111); the boundary (131) can be determined to be in the lower portion of the memory region where data popped onto the stack (e.g., 111) and stored in the lower portion of the memory region would be popped off the stack (e.g., 111) before the data in the middle of the memory region is popped off the stack (e.g., 111); and the subsequent search is performed in the lower portion of the memory region, which reduces the area of search from the entire memory region to the lower portion of the memory region. The operation of retrieving data from the middle of the memory region to be searched to identify the next memory region to be searched can be repeated until the boundary (131) is found.

By performing the binary search, the stack manager (114) can determine the maximum memory usages of the respective stacks (111, . . . , 113) without additional inputs from the processors (121, . . . , 123) and/or processes that use the stacks (111, . . . , 113).

The stack manager (114) can periodically examine the maximum memory usages of the respective stacks (111, . . . , 113) and re-partition the stack memory (102) for the stacks (111, . . . , 113) according to the maximum memory usages of the respective stacks (111, . . . , 113) to prevent stack overflow.

In response to stack overflow in the operation of a particular stack (e.g., 111, . . . , or 113), the stack manager (114) can examine the maximum memory usages of the respective stacks (111, . . . , 113) and re-partition the stack memory (102) for the stacks (111, . . . , 113) according to the maximum memory usages of the respective stacks (111, . . . , 113) to solve the problem of stack overflow.

In some instances, the stack manager (114) periodically instructs the processors (121, . . . , 123) and/or processes that use the stacks (111, . . . , 113) to fill, using the predetermined value (or the predetermined value pattern), the portions of the stacks (111, . . . , 113) that are not currently being used. In response, the processors (121, . . . , 123) stores the predetermined value (or the predetermined value pattern) in the portions of their stacks (111, . . . , 113) that are beyond the current depths of their stacks (111, . . . , 113) such that the boundaries (131, . . . , 133) represents the current depths, instead of the maximum depths reached in the past period of time. Such an initialization operation allows the stack manager (114) to measure the maximum depths in the next time period following the initialization operations.

After the currently unused portions of the stacks (111, . . . , 113) are filled with the predetermined value (or the predetermined value pattern), the boundaries (131, . . . , 133) that are determined subsequently after a period of stack operations represent the memory requirements during the most recent time period between the initialization operation of filling the unused portion of the stacks (111, . . . , 113) and the determination of the boundaries (131, . . . , 133). For the subsequent stack operations after the most recent time period, the stack partition can be optimized according to the memory requirements of the stacks (111, . . . , 113) in their operations during the most recent time period. For example, the sizes of the stacks (111, . . . , 113) can be re-balanced or re-optimized based on the maximum stack depths reached in the stacks (111, . . . , 113) during the most recent stack operations, which typically change from time to time.

In an alternative way to initialize the currently unused portions of the stacks (111, . . . , 113), the stack manager (114) pauses the stack operations by the processors (121, . . . , 123) and/or processes, obtains the current depths of the stacks (111, . . . , 113) (e.g., from a set of registers storing the current depths of the stacks (111, . . . , 113), stores the predetermined value (or the predetermined value pattern) in the currently unused portions of the portions of the stacks (111, . . . , 113) that are beyond the current depths of the stacks (111, . . . , 113), and resumes the stack operations by the processors (121, . . . , 123) and/or processes. Data popped onto the stacks (e.g., 111, . . . , 113) and stored beyond the current depths of the stacks (111, . . . , 113) would be popped off the stacks (111, . . . , 113) before the data under the current depths are popped off the stacks (e.g., 111, . . . , 113).

Figure 5:
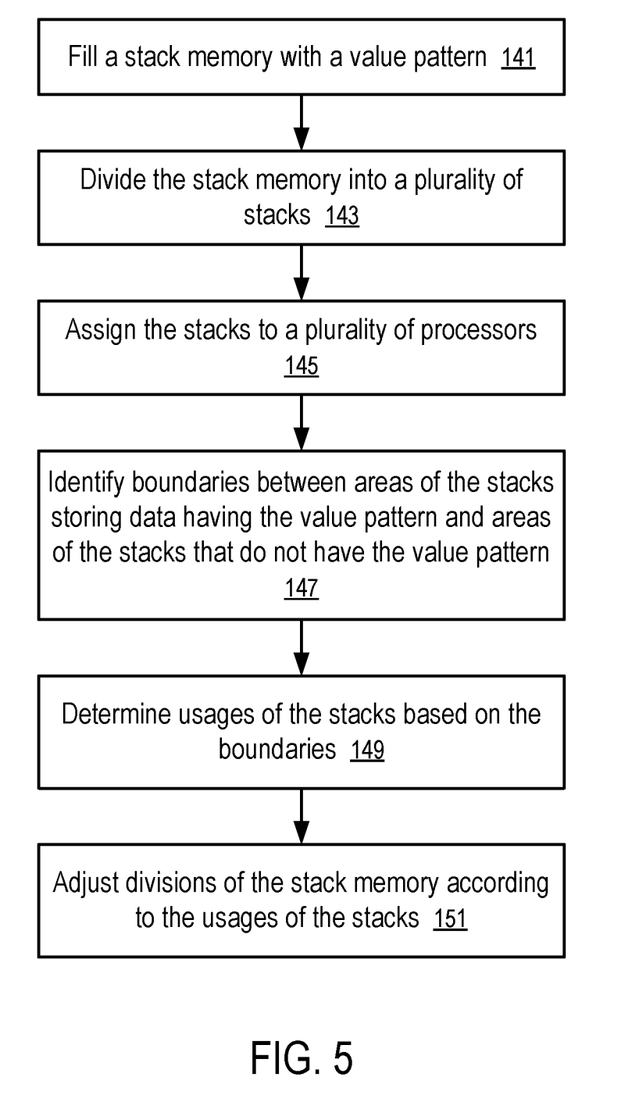
FIG. 5 shows a method to manage stacks.

FIG. 5 shows a method to manage stacks. For example, the method of FIG. 5 can be used in the memory system (108) of FIG. 1 in general and in the storage system (103) of FIG. 2 as an example, in view of the technique discussed above in connection with FIGS. 3 and 4.

The method of FIG. 5 includes: filling (141) a stack memory (102) with a value pattern; dividing (143) the stack memory (102) into a plurality of stacks (111, . . . , 113); assigning (145) the stacks (111, . . . , 113) to a plurality of processors (121, . . . , 123) (and/or processes); identifying (147) boundaries (131, . . . , 133) between areas of the stacks storing data having the value pattern (e.g., shaded areas in FIG. 4) and areas (132, . . . , 134) of the stacks that do not have the value pattern; determining (149) usages of the stacks (111, . . . , 113) based on the boundaries (131, . . . , 133), such as the maximum stack depths that have been reached in the stacks (111, . . . , 113) during a time period prior to the determination of the boundaries (131, . . . , 133); and adjusting (151) divisions of the stack memory (102) according to the usages of the stacks (111, . . . , 113).

For example, a memory system (108) or a storage system (103) includes a stack memory (102), a set of media (109A, . . . , 109N, or 109), and a controller (107). The controller (107) divides the stack memory (102) into a plurality of stacks (111, . . . , 113), measures usages of the stacks (111, . . . , 113) in a period of time of operations of the set of media (109A, . . . , 109N, or 109), and adjusts partitioning of the stack memory (102) into the plurality of stacks (111, . . . , 113) according to the measured usages. For example, the sizes of the stacks (111, . . . , 113) can be adjusted according to the maximum depths of the stacks (111, . . . , 113) during the operations of the set of media (109A, . . . , 109N, or 109). Examples of such operations include storing, in the media (109A, . . . , 109N, or 109), data from the host system (101), retrieving from the media (109A, . . . , 109N, or 109) data to be reported to the host system (101), in response to input/output requests or commands from the host system (101).

For example, the set of media (109A, . . . , 109N, or 109) includes a flash memory; and the memory system (108) or the storage system (103) is a solid state drive (SSD).

For example, the controller (107) fills unused portions of the stacks (111, . . . , 113) with a predetermined value pattern and measures the usages based on searching for boundaries (131, . . . , 113) between portions of the stacks (111, . . . , 113) having the predetermined value pattern (e.g., shaded areas illustrated in FIG. 4) and portions (132, . . . , 134) of the stacks (111, . . . , 113) not having the predetermined value pattern.

For example, the predetermined value pattern can be a predetermined value filled in the unused portions of the stacks (111, . . . , 113), or values that have a predetermined relation with the locations at which the values are stored. For example, a value stored at a memory location the predetermined relation of being proportional to, or same as, the address or address offset of the memory location in the respective stack (e.g., 111, . . . , or 113) or the address or address offset of the memory location in the stack memory (102).

The searching for the boundaries (131, . . . , 113) can be performed via a binary search. In an example of the binary search, a region in the stack memory (102) is initially identified to contain a boundary between a portion storing the predetermined value pattern and a portion not storing the predetermined value pattern. After retrieving a value from the middle of the memory region that contains the boundary, the controller (107) determines whether the value agrees with the predetermined value pattern. The storage location of the value in the middle of the memory region divides the memory region into two. Which one of the two contains the boundary can be determined or identified based on whether the value matches with or agrees with the predetermined value pattern.

For example, a stack manager (114) of the storage system (103) may be implemented as a portion of the firmware (104) executing in the controller (107). Alternatively, a function of the stack manager (114) of the storage device (103) can be implemented as a portion of the hardware circuitry of the controller (107). The controller (107) of the storage system (103) or the memory system (108) can have one or more processors (121, . . . , 123). One or more of the processors (121, . . . , 123) can be configured via the firmware (104) to implement the functions of the stack manager (114).

The storage system (103) of FIG. 2 can be attached to the host system (101) in FIG. 1 as an implementation of the memory system (108). A communication channel between the host system (101) and the memory system (108) in general and the storage system (103) in particular allows the host system (101) to send data requests and/or other commands that trigger certain operations of the controller (107) on the media (e.g., 109A to 109N, 109), such as date write operations, data read operations, data erasure operations. A host interface (105) implements the communication protocols of the communication channel.

In some implementations, the communication channel between the host system (101) and the memory system (108) or the storage system (103) includes a bus for computer peripheral devices, such as a PCIe bus, a SATA bus, a USB bus.

In some implementations, the communication channel between the host system (101) and the storage system (103) includes a computer network, such as a local area network, a wireless local area network, a wireless personal area network, a cellular communications network, a broadband high-speed always-connected wireless communication connection (e.g., a current or future generation of mobile network link); and the host system (101) and the storage system (103) can be configured to communicate with each other using data storage management and usage commands similar to those in NVMe protocol.

The controller (107) of the storage system (103) can run firmware (104) to perform operations responsive to the communications from the host system (101). Firmware in general is a type of computer program that provides control, monitoring and data manipulation of engineered computing devices.

The storage system (103) can have non-volatile storage media (109). Examples of non-volatile storage media (109) include memory cells formed in an integrated circuit and magnetic material coated on rigid disks. Non-volatile storage media (109) can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors (121, . . . , 123), each having its own in-processor cache memory.

Optionally, the controller (107) performs data intensive, in-memory processing using data and/or instructions organized in the storage system (103). For example, in response to a request from a host system (101), the controller (107) performs a real time analysis of a set of data stored in the storage system (103) and communicates a reduced data set to the host system (101) as a response. For example, in some applications, the storage system (103) is connected to real time sensors to store sensor inputs; and the processors (120, 121, . . . , 123) of the controller (107) are configured to perform machine learning and/or pattern recognition based on the sensor inputs to support an artificial intelligence (AI) system that is implemented at least in part via the storage system (103) and/or the host system (101).

In some implementations, the processors (120, 121, . . . , 123) of the controller (107) are integrated with memory (e.g., 119, 109A, . . . , 109N, 106, 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate and decreases latency and power usage.

The storage system (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

Some embodiments involving the operation of the controller (107) can be implemented using computer instructions executed by the controller (107), such as the firmware (104) of the controller (107). In some instances, hardware circuits can be used to implement at least some of the functions. The firmware (104) can be initially stored in the non-volatile storage media (109), or another non-volatile device, and loaded into the volatile DRAM (106) and/or the in-processor cache memory for execution by the controller (107).

A non-transitory computer storage medium can be used to store instructions of the firmware (104) of the memory system (108) in general and the storage system (103) in particular. When the instructions are executed by the controller (107) of the memory system (108) or the storage system (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or micro-controller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A memory system, comprising:
   a stack memory;
   a set of media; and
   a controller, wherein the controller divides the stack memory into a plurality of stacks, measures usages of the stacks in a period of time, and adjusts partitioning of the stack memory into the plurality of stacks according to the measured usages,
   wherein the controller fills unused portions of the stacks with a predetermined value pattern and measures the usages based on binary searching for boundaries between portions of the stacks having the predetermined value pattern and portions of the stacks not having the predetermined value pattern.

2. The memory system of claim 1, wherein the set of media includes a flash memory.

3. The memory system of claim 2, wherein the memory system is a solid state drive.

4. The memory system of claim 2, wherein the controller operates the stacks to store data in the flash memory and retrieve data from the flash memory in accordance with requests from a host system.

5. The memory system of claim 1, wherein the predetermined value pattern is a predetermined value.

6. The memory system of claim 1, wherein the predetermined value pattern includes a value stored in a location of the stack memory having a predetermined relation with the location.

7. The memory system of claim 1, wherein the binary search includes:
   identifying a memory region that contains a boundary between a portion storing the predetermined value pattern and a portion not storing the predetermined value pattern;
   retrieving from a middle of the memory region a value, the storage location of the value dividing the memory region into two regions;
   determining whether the value agrees with the predetermined value pattern; and
   identifying one of the two regions as having the boundary based on whether the value agrees with the predetermined value pattern.

8. A method in a memory system, comprising:
   partitioning, by a stack manager, a stack memory of the memory system into a plurality of stacks;
   operating the stacks to process requests related to storing data in a set of media of the memory system and retrieving data from the set of media;
   measuring, by the stack manager, usages of the stacks during a period of time;
   re-partitioning, by the stack manager, the stack memory into the plurality of stacks according to the measured usages; and
   filling, by the stack manager, unused portions of the stacks with a predetermined value pattern,
   wherein the measuring of the usages includes binary searching for boundaries between portions of the stacks having the predetermined value pattern and portions of the stacks not having the predetermined value pattern.

9. The method of claim 8, wherein the set of media includes a flash memory; and the memory system is a solid state drive.

10. The method of claim 9, further comprising:
    receiving, from a host system, the requests, wherein the stacks are operated in response to the read and write requests.

11. The method of claim 8, wherein the predetermined value pattern includes a predetermined value or a value stored in a location of the stack memory having a predetermined relation with the location.

12. The method of claim 8, wherein the searching includes:
- identifying a memory region that contains a boundary between a portion storing the predetermined value pattern and a portion not storing the predetermined value pattern;
- retrieving from a middle of the memory region a value, the storage location of the value dividing the memory region into two regions;
- determining whether the value matches with the predetermined value pattern; and
- identifying one of the two regions as having the boundary based on whether the value matches with the predetermined value pattern.

13. A non-transitory computer storage medium storing instructions which when executed by a controller of a memory system cause the memory system to perform a method, the method comprising:
- dividing a stack memory of the memory system into a plurality of stacks, wherein the memory system is a solid state drive;
- after the stacks are used to process requests related to storing data in a set of media of the memory system and retrieving data from the set of media, measuring usages of the stacks during a period of time, wherein the set of media includes a flash memory;
- adjusting partitioning of the stack memory into the plurality of stacks according to the measured usages; and
- filling, by the stack manager, unused portions of the stacks with a predetermined value pattern;
- wherein the measuring of the usages includes searching for boundaries between portions of the stacks having the predetermined value pattern and portions of the stacks not having the predetermined value pattern,
- wherein the searching includes:
  - identifying a memory region that contains a boundary between a portion storing the predetermined value pattern and a portion not storing the predetermined value pattern;
  - retrieving from a middle of the memory region a value, the storage location of the value dividing the memory region into two regions;
  - determining whether the value matches with the predetermined value pattern; and
  - identifying one of the two regions as having the boundary based on whether the value matches with the predetermined value pattern.

14. The medium of claim 13, wherein the predetermined value pattern includes a predetermined value or a value stored in a location of the stack memory having a predetermined relation with the location.

* * * * *